(12) United States Patent
Kang et al.

(10) Patent No.: US 7,685,879 B2
(45) Date of Patent: Mar. 30, 2010

(54) DIFFERENTIAL PRESSURE MEASURING TRANSDUCER UNIT

(75) Inventors: Sangkyun Kang, Seoul (KR); Wolfgang Scholz, Minden (DE); Peter Krippner, Karlsruhe (DE); Dieter Binz, Hirschberg (DE); Tibor Fabian, Mountain View, CA (US); Fritz B. Prinz, Woodside, CA (US)

(73) Assignees: ABB AG, Mannheim (DE); Stanford University, Palo Alto, CA (US)

( * ) Notice: Subject to any disclaimer, the term of this patent is extended or adjusted under 35 U.S.C. 154(b) by 0 days.

(21) Appl. No.: 11/791,948

(22) PCT Filed: Dec. 8, 2004

(86) PCT No.: PCT/EP2004/013924

§ 371 (c)(1),
(2), (4) Date: Apr. 18, 2008

(87) PCT Pub. No.: WO2006/061035

PCT Pub. Date: Jun. 15, 2006

(65) Prior Publication Data

US 2008/0257054 A1     Oct. 23, 2008

(51) Int. Cl.
*G01L 13/02* (2006.01)
(52) U.S. Cl. .......................................... 73/716; 73/736
(58) Field of Classification Search ............ 73/700–756
See application file for complete search history.

(56) References Cited

U.S. PATENT DOCUMENTS

| | | | |
|---|---|---|---|
| 4,285,244 A * | 8/1981 | Green | 73/720 |
| 4,665,753 A | 5/1987 | Bertrand | |
| 6,484,584 B2 * | 11/2002 | Johnson et al. | 73/624 |
| 6,536,288 B2 * | 3/2003 | Scholz et al. | 73/718 |
| 6,598,482 B2 * | 7/2003 | Scholz et al. | 73/716 |
| 2002/0194918 A1 * | 12/2002 | Scholz et al. | 73/716 |
| 2002/0194920 A1 * | 12/2002 | Scholz et al. | 73/718 |

FOREIGN PATENT DOCUMENTS

DE     38 27 138 A1     2/1989

(Continued)

OTHER PUBLICATIONS

English language translation of International Preliminary Report on Patentability (Form PCT/IPEA/409).

(Continued)

*Primary Examiner*—Andre J Allen
(74) *Attorney, Agent, or Firm*—Buchanan Ingersoll & Rooney PC

(57) ABSTRACT

The disclosure relates to a differential pressure transducer unit comprising an over-load protection system which is used to measure low differential pressure in liquids and gases under high static pressure load which can be connected to flanges on the working pressure lines. The differential pressure transducer unit consists of a planar multi-layered arrangement comprising layers which are conductive, insulating and which are insulated from each other, whereby the insulating and conductive layers comprises recesses which at least partially cover each other, wherein the measuring mechanism and the measuring value processing means are accommodated. At least one of the layers is a functional component of the over-load protection system.

28 Claims, 4 Drawing Sheets

FOREIGN PATENT DOCUMENTS

Figure 1:
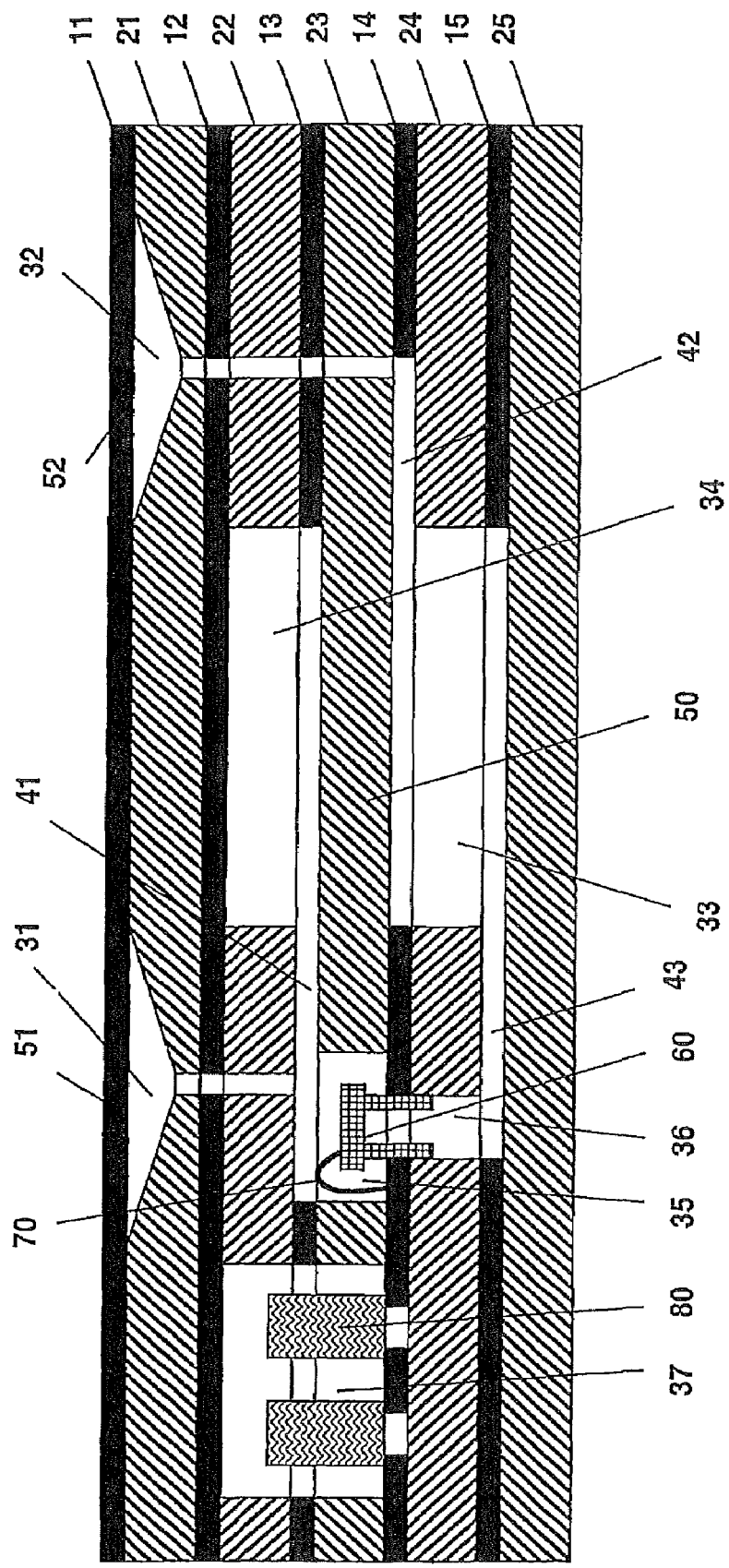

| | | |
|---|---|---|
| DE | 196 48 424 C1 | 6/1998 |
| EP | 0 143 702 A2 | 6/1985 |
| EP | 0 762 096 A | 3/1997 |
| GB | 2 065 893 A | 7/1981 |
| WO | WO 88/02107 A1 | 3/1988 |
| WO | WO 01/69194 A | 9/2001 |

OTHER PUBLICATIONS

Hartmann & Braun, "Contrans P, Intelligenter MEβumformer Ask 810 Für Absolutdruck", Oct. 1992, Listenblatt 10/15-6.21, pp. 1-6 (cited on p. 2 of the specifiction).

International Search Report.

* cited by examiner

DIFFERENTIAL PRESSURE MEASURING TRANSDUCER UNIT

The invention relates to a differential pressure measuring transducer unit for measuring a small differential pressure in liquids and gases under a high static pressure load, which can be connected to the active pressure lines by flanges.

Such devices are known by prior use and from relevant publications. Their basic mechanical structure is described in detail in GB 2 065 893 and EP 0 143 702. Irrespective of the type of conversion of mechanical pressure/differential pressure signals into equivalent electrical quantities, the two prior publications provide an essentially cylindrical central body which is enclosed between two similar bowl-shaped caps by using appropriate sealing means. These caps are screwed together by a multiplicity of radially arranged and mechanically prestressed bolts, the mechanical prestress of the bolts being selected so as to avoid a pressure loss at the central body under the maximally permissible static pressure load.

Owing to this mechanical prestress inherent in the principle, which varies individually from device to device, a mechanical prestress of the central body occurs which causes a prestress-dependent offset or a prestress-dependent characteristic curve deformation of the measuring or overload membrane extending over a midplane of the central body. Furthermore, the required seals are to be adapted to the device in respect of their material composition as a function of the process medium, and they are moreover susceptible to wear.

Each cap comprises a recess on the central body side, which is connected to flange terminals via channels, which are usually configured as bores. The mid-spacing of these channels is dictated by standardization on the flange terminals.

The central body axisymmetrically comprises a neck on which a head part is fastened, in which means for measured value conversion, processing and display are provided according to GB 2 065 893.

The multiplicity of required pressure-tight assembly points of the known pressure measuring devices requires precision processing to be machined extensively at a multiplicity of individual points.

Furthermore, WO 88/02107 discloses a pressure measuring device which consists of a cylindrical base body on which tangential flow terminals, between which the pressure sensor lies, are provided on one side. Although this device has a smaller number of pressure-tight assembly points, its type of mounting is constrained with a fixed allocation of the display means to the device position.

A particular problem of such measuring devices with an overload protection system, which is intended to protect the sensitive differential pressure sensor from damage in the event of a unilateral pressure drop, in which case the static pressure is applied as a differential pressure, resides in the electrical connection of the sensor elements to downstream measured value processing means. To this end, Hartmann & Braun list sheet 10/15-6.21, October 1992 edition, discloses a measuring transducer in which the measuring capsule comprising the measuring mechanism is suspended from an axisymmetrically extending overload membrane. The measuring mechanism arranged mobile relative to the package on the overload membrane requires flexible connection lines, which are also stressed in their flexibility, and at least two pressure-tight resilient feeds for each connection line, one of which leads out of the measuring mechanism and another of which leads out of the package which encloses the pressure space.

Particularly in the case of self-correcting differential pressure measuring transducer units which, besides the differential pressure sensor, also comprise an absolute pressure sensor and a temperature sensor to compensate for pressure- and the temperature-dependent measurement errors, a high outlay is thus required for the electrical connection technology, which moreover reduces the long-term reliability.

Furthermore, the known differential pressure measuring transducer units are characterized by an elaborate multi-part and specialized structure, which is produced by miscellaneous assembly technologies.

It is therefore an object of the invention, in an overload-protected differential pressure measuring transducer unit of the type mentioned in the introduction, to reduce the number of pressure-tight resilient feeds and substantially obviate permanently stressed flexible connection lines.

According to the invention, this object is achieved by the means of patent claim 1. Advantageous refinements of the invention are described in patent claims 2 to 15.

The invention is based on a differential pressure measuring transducer unit with an overload protection system for its measuring mechanism, having at least one sensor, in which the measuring mechanism is connected via pressure-tight electrical feeds to measured value processing means and in which a pressure averager spatially separated from the process medium is applied to the measuring mechanism.

The essence of the invention consists in a planar multi-layered arrangement consisting of insulating layers and conductive layers insulated from one another, which comprise partially overlapping recesses into which the measuring mechanism and the measured value processing means are fitted. Furthermore, at least one of the layers is a functional component of the overload system.

Although multi-layered arrangements consisting of insulating layers and conductive layers insulated from one another are known in principle in the form of multi-layered circuit boards as support elements for electronic components in printed circuits, it has surprisingly been shown that the carrier material is suitable as a functional element in the overload protection system of a differential pressure measuring transducer unit.

The starting point of the multi-layered arrangement is a circuit board known per se, consisting of a supporting insulator layer and at least one conductive layer structured in the form of interconnections. The measuring mechanism and the measured value processing means are mounted on this circuit board. Further equivalent insulating layers and conductive layers insulated from one another are stacked on at least one side of this circuit board.

The electrical connections between the measuring mechanism and the measured value processing means are configured as patterns in the conductive layer of the circuit board. Permanently stressed flexible connection lines are thereby fully obviated.

By virtue of the lateral structure of the mechanical layout, the pressure-tight electrical leads are guided along the layers while obviating layer penetrations. This fully obviates additional technical means for leading electrical lines out of pressurized spaces into pressure-free spaces. The number of pressure-tight resilient feeds is therefore made insignificant.

According to one feature of the invention, one of the inner insulating layers is designed as a membrane of the overload protection system of the differential pressure measuring transducer unit.

According to an alternative feature of the invention, one of the inner conductive layers is designed as a membrane of the overload protection system of the differential pressure measuring transducer unit. This measure minimizes the risk of irreversible deformation of the membrane under a static overload.

Advantageously, the constituents of the package of the measuring mechanism and of the measured value processing means, the support elements for the measured value processing means including the electrical connection means as well as the constituents of the overload protection system, are made from the same material combination and are assembled according to a uniform method.

Supporting and functional elements are particularly advantageously combined in the same component. This component is produced by a technologically undemanding process known per se.

Figure 2:
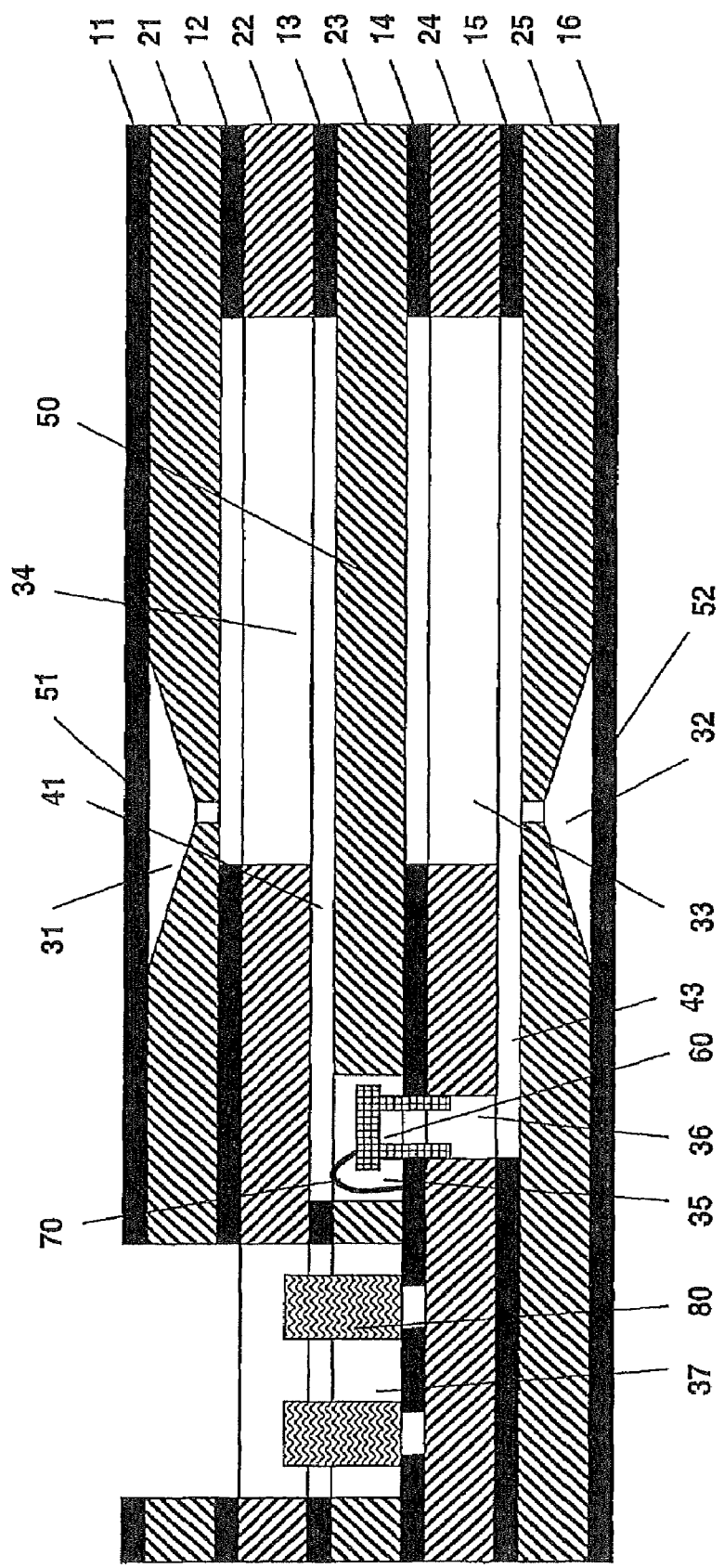
Figure 3:
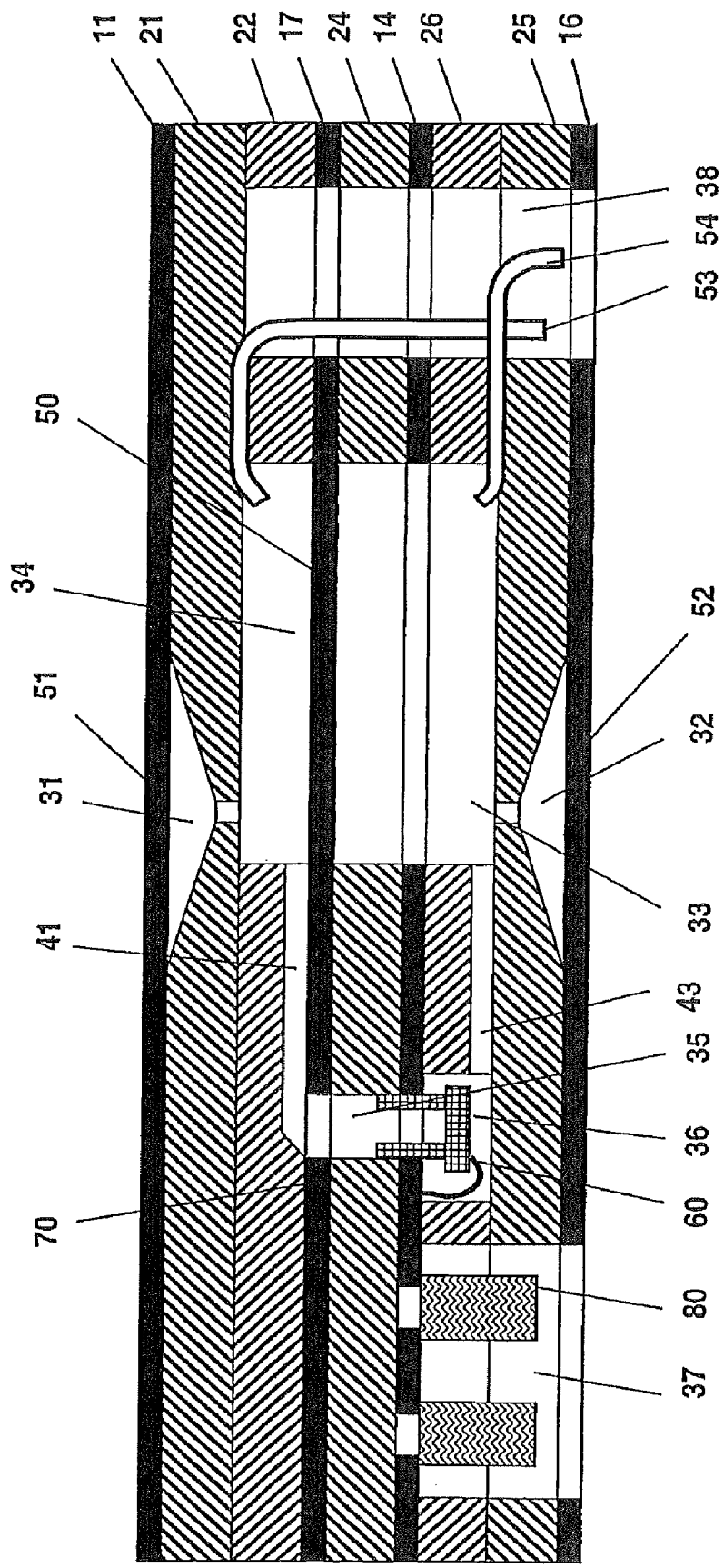
Figure 4:
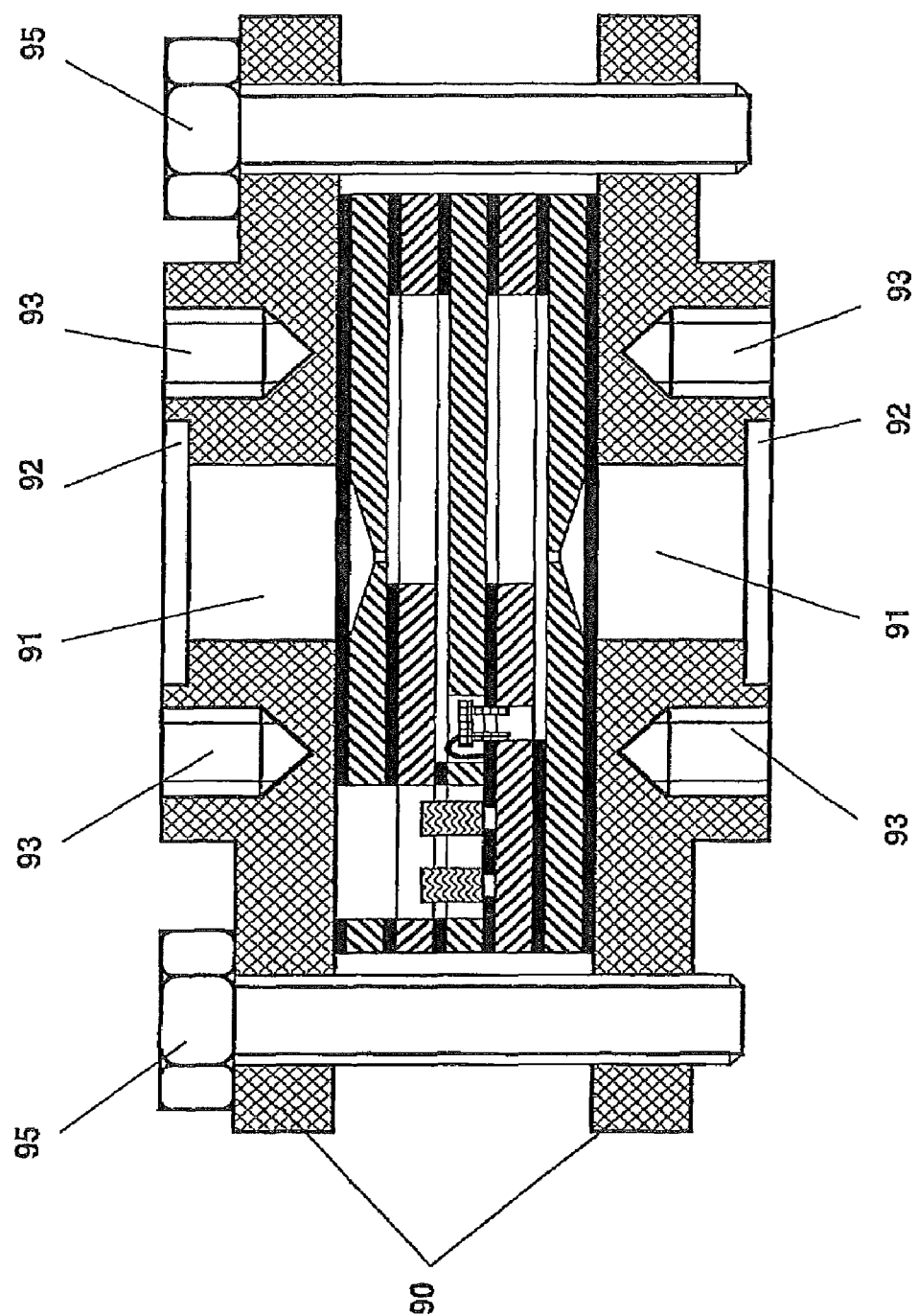

Other details and advantages of the invention will be explained in more detail below with reference to exemplary embodiments. In the requisite drawings:

FIG. 1 shows a sectional representation of a first embodiment of a differential pressure measuring transducer unit FIG. 2 shows a sectional representation of a second embodiment of a differential pressure measuring transducer unit FIG. 3 shows a sectional representation of a third embodiment of a differential pressure measuring transducer unit FIG. 4 shows a sectional representation of a differential pressure measuring transducer FIG. 1 shows a sectional representation of the essential constituents of a differential pressure measuring transducer unit in a first embodiment. The differential pressure measuring transducer unit consists essentially of a stack of insulating layers 21 to 25 and conductive layers 11 to 15 insulated from one another, which comprise partially overlapping recesses 31 to 37, into which a measuring mechanism 60 and measured value processing means 80 are fitted.

In this first embodiment, the insulating layer 21 comprises two identical funnel-shaped recesses 31 and 32. The outside of the insulating layer 21 is covered by the conductive layer 11, which is configured as a separating membrane 51 and 52 in the region of the recesses 31 and 32. The separating membranes 51 and 52 are preferably embossed in the form of a concentric corrugated pattern known per se. The process pressures act on the other side of the separating membranes 51 and 52 from the insulating layer 21.

The insulating layers 22 and 24 separated from one another by the insulating layer 23 comprise congruent recesses 33 and 34. In the overlap region of the recesses 33 and 34, the insulating layer 23 is configured as a membrane. The recess 33 is connected to the funnel-shaped recesses 32 via a channel 42. The recess 34 is connected to the funnel-shaped recess 31 via a channel 41.

The insulating layers 23 and 24 as well as the conductive layer 14 furthermore comprise partially overlapping recesses 35 and 36, into which the measuring mechanism 60 is fitted. The measuring mechanism 60 is connected pressure-tightly to the insulating layer 24. The conductive layer 14 is patterned with openings. The measuring mechanism 60 comprises electrical terminals, which are connected via bonding connections 70 to various patterns of the conductive layer 14. The recess 35 is connected via the aforementioned channel 41 to the funnel-shaped recesses 31 and the recess 34. The recess 36 is connected via a channel 43 to the recess 33 and in continuation via the channel 42 to the funnel-shaped recess 32.

The channels 41 to 43 are configured as recesses of the conductive layers 13 and 14 arranged between the insulating layers 22, 23 and 24.

The membrane 50 and the recesses 33 and 34 constitute the overload system of the differential pressure measuring transducer unit. The difference in the process pressure acting on the separating membranes 51 and 52 deflects the separating membranes 51 and 52 while increasing or decreasing the free volumes of the recesses 33 and 34. The volume difference is equalized via the channels 41 to 43 into the sensor chambers 35 and 36 and the recesses 33 and 34. In the event of an overload, the membrane 50 is deflected pressure-dependently.

The insulating layers 22 and 23 as well as the conductive layer 13 furthermore comprise overlapping recesses 37, into which the measured value processing means 80 are fitted. In this embodiment, the recess 37 is closed on all sides so that the measured value processing means 80 are embedded while being protected against mechanical damage. The measured value processing means 80 are electrically and mechanically connected to track-shaped patterns of the conductive layer 14.

The conductive layers 12 and 15, arranged between the insulating layers 21 and 22 as well as 24 and 25, are designed as shielding surfaces for shielding the measuring mechanism 60 and the measured value processing means 80 from electromagnetic radiation.

In particular, it is proposed that the conductive layers 12 to 15 should consist of copper and the insulating layers 21 to 25 should consist of fiber-reinforced synthetic resin. For the conductive layer 11, stainless steel is preferred.

Starting with a base circuit board consisting of the insulating layer 24 and the conductive layer 14, during the production of the differential pressure measuring transducer unit, further insulating and conductive layers are applied according to the structure described above with the interposition of an adhesion promoter, and the entire stack is hot-pressed together.

In a preferred embodiment an adhesive film known per se, consisting of synthetic resin, is provided as the adhesion promoter. As an alternative, it may be proposed for the differential pressure measuring transducer unit to be constructed from a stack of synthetic resin plates covered with copper on both sides, and for solder to be provided as the adhesion promoter.

The recesses 31 to 36 as well as the channels 41 to 43 are filled with a substantially incompressible fluid, in particular silicone oil. The fluid is introduced into the cavities via capillaries 53 and 54 represented in FIG. 3. After filling, the capillaries 53 and 54 are closed pressure-tightly.

Using the same references for means which are the same, FIG. 2 shows a second embodiment of the differential pressure measuring transducer unit according to the invention. The differential pressure measuring transducer unit consists essentially of a stack of insulating layers 21 to 25 and conductive layers 11 to 16 insulated from one another, which comprise partially overlapping recesses 31 to 37, into which a measuring mechanism 60 and measured value processing means 80 are fitted.

In this second embodiment, the insulating layers 21 and 25 respectively comprise a funnel-shaped recess 31 and 32 which lie symmetrically opposite. The outside of the insulating layer 21 is covered by the conductive layer 11 and the outside of the insulating layer 25 is covered by the conductive layer 16. In the region of the recesses 31 and 32, the conductive layers 11 and 16 are configured as a separating membrane 51 and 52. The separating membranes 51 and 52 are preferably embossed in the form of a concentric corrugated pattern known per se. The process pressures act on the other side of the separating membrane 51 from the insulating layer 21 and on the other side of the separating membrane 52 from the insulating layer 25.

The insulating layers 22 and 24 separated from one another by the insulating layer 23 comprise congruent recesses 33 and 34. In the overlap region of the recesses 33 and 34, the insulating layer 23 is configured as a membrane 50. The recess 33 is connected to the funnel-shaped recess 32. The recess 34 is connected to the funnel-shaped recess 31.

The insulating layers 23 and 24 as well as the conductive layer 14 furthermore comprise partially overlapping recesses 35 and 36, into which the measuring mechanism 60 is fitted. The measuring mechanism 60 is connected pressure-tightly to the insulating layer 24. The conductive layer 14 is patterned with openings. The measuring mechanism 60 comprises electrical terminals, which are connected via bonding connections 70 to various patterns of the conductive layer 14. The recess 35 is connected via a channel 41 to the recess 34 and in continuation to the funnel-shaped recesses 31. The recess 36 is connected via a channel 43 to the recess 33 and in continuation to the funnel-shaped recess 32.

The channels 41 to 43 are configured as recesses of the conductive layers 13 and 15 arranged between the insulating layers 22 and 23 as well as 24 and 25.

The membrane 50 and the recesses 33 and 34 constitute the overload system of the differential pressure measuring transducer unit. The difference in the process pressure acting on the separating membranes 51 and 52 deflects the separating membranes 51 and 52 while increasing or decreasing the free volumes of the recesses 33 and 34. The volume difference is equalized into the recesses 33 and 34 and via the channels 41 to 43 into the measuring mechanism chambers 35 and 36. In the event of an overload, the membrane 50 is deflected pressure-dependently.

The insulating layers 21, 22 and 23 as well as the conductive layers 11, 12 and 13 furthermore comprise overlapping recesses 37, into which the measured value processing means 80 are fitted. In this embodiment, the recess 37 is open on one side so that the measured value processing means 80 are accessible but still embedded while being substantially protected against mechanical damage. The measured value processing means 80 are electrically and mechanically connected to track-shaped patterns of the conductive layer 14.

The conductive layers 12 and 15, arranged between the insulating layers 21 and 22 as well as 24 and 25, are designed as shielding surfaces for shielding the measuring mechanism 60 and the measured value processing means 80 from electromagnetic radiation.

In particular, it is proposed that the conductive layers 12 to 15 should consist of copper and the insulating layers 21 to 25 should consist of fiber-reinforced synthetic resin. For the conductive layers 11 and 16, stainless steel is preferred.

Starting with a base circuit board consisting of the insulating layer 24 and the conductive layer 14, during the production of the differential pressure measuring transducer unit, further insulating and conductive layers are applied according to the structure described above with the interposition of an adhesion promoter, and the entire stack is hot-pressed together.

In a preferred embodiment an adhesive film known per se, consisting of synthetic resin, is provided as the adhesion promoter. As an alternative, it may be proposed for the differential pressure measuring transducer unit to be constructed from a stack of synthetic resin plates covered with copper on both sides, and for solder to be provided as the adhesion promoter.

The recesses 31 to 36 as well as the channels 41 to 43 are filled with a substantially incompressible fluid, in particular silicone oil. The fluid is introduced into the cavities via capillaries 53 and 54 represented in FIG. 3. After filling, the capillaries 53 and 54 are closed pressure-tightly.

Using the same references for means which are the same, FIG. 3 shows a third embodiment of the differential pressure measuring transducer unit according to the invention. The differential pressure measuring transducer unit in this third embodiment also consists essentially of a stack of insulating layers 21 to 26 and conductive layers 11 to 16 insulated from one another, which comprise partially overlapping recesses 31 to 37, into which a measuring mechanism 60 and measured value processing means 80 are fitted.

In this third embodiment, the insulating layers 21 and 25 respectively comprise a funnel-shaped recess 31 and 32 which lie symmetrically opposite. The outside of the insulating layer 21 is covered by the conductive layer 11 and the outside of the insulating layer 25 is covered by the conductive layer 16. In the region of the recesses 31 and 32, the conductive layers 11 and 16 are configured as a separating membrane 51 and 52. The separating membranes 51 and 52 are preferably embossed in the form of a concentric corrugated pattern known per se. The process pressures act on the other side of the separating membrane 51 from the insulating layer 21 and on the other side of the separating membrane 52 from the insulating layer 25.

The insulating layers 22 and 24 separated from one another by the conductive layer 17, as well as the insulating layer 26 and the conductive layer 14, comprise congruent recesses 33 and 34. In the overlap region of the recesses 33 and 34, the conductive layer 17 is configured as a membrane 50. The recess 33 is connected to the funnel-shaped recess 32. The recess 34 is connected to the funnel-shaped recess 31.

The insulating layers 24 and 26 as well as the conductive layer 14 furthermore comprise partially overlapping recesses 35 and 36, into which the measuring mechanism 60 is fitted. The measuring mechanism 60 is connected pressure-tightly to the insulating layer 24. The conductive layer 14 is patterned with openings. The measuring mechanism 60 comprises electrical terminals, which are connected via bonding connections 70 to various patterns of the conductive layer 14. The recess 35 is connected via a channel 41 to the recess 34 and in continuation to the funnel-shaped recesses 31. The recess 36 is connected via a channel 43 to the recess 33 and in continuation to the funnel-shaped recess 32.

The channels 41 to 43 are configured as recesses in the insulating layers 22 and 26. The channel-forming recesses are preferably impressed into the insulating layers 22 and 26.

The membrane 50 and the recesses 33 and 34 constitute the overload system of the differential pressure measuring transducer unit. The difference in the process pressure acting on the separating membranes 51 and 52 deflects the separating membranes 51 and 52 while increasing or decreasing the free volumes of the recesses 33 and 34. The volume difference is equalized into the recesses 33 and 34 and via the channels 41 to 43 into the measuring mechanism chambers 35 and 36. In the event of an overload, the membrane 50 is deflected pressure-dependently.

The insulating layers 25 and 26 as well as the conductive layer 16 furthermore comprise overlapping recesses 37, into which the measured value processing means 80 are fitted. In this embodiment, the recess 37 is open on one side so that the measured value processing means 80 are accessible but still embedded while being substantially protected against mechanical damage. The measured value processing means 80 are electrically and mechanically connected to track-shaped patterns of the conductive layer 14.

The conductive layer 17, arranged between the insulating layers 22 and 24, is designed as a shielding surface for shielding the measuring mechanism 60 and the measured value processing means 80 from electromagnetic radiation.

A recess 38 is furthermore provided, which in this third embodiment is arranged congruently in the insulating layers 22 and 24 to 26 as well as in the conductive layers 14, 16 and 17. The ends of two capillaries 53 and 54, the opposite ends of which respectively extend into the recesses 33 and 34, are fitted as measuring transducer-specific equipment elements in this recess 38.

In particular, it is proposed that the conductive layers 14 and 17 should consist of copper and the insulating layers 21 to 26 should consist of fiber-reinforced synthetic resin. For the conductive layers 11 and 16, stainless steel is preferred.

Starting with a base circuit board consisting of the insulating layer 24 and the conductive layer 14, during the production of the differential pressure measuring transducer unit, further insulating and conductive layers are applied according to the structure described above with the interposition of an adhesion promoter, and the entire stack is hot-pressed together.

Irrespective of the embodiment, before the insulating layer 21 is applied, the capillary 53 is introduced so that the one tube end projects into the recess 34 and the other tube end projects into the recess 38. Before the insulating layer 25 is applied, the capillary 54 is introduced so that one tube end projects into the recess 33 and the other tube end projects into the recess 38.

In a preferred embodiment an adhesive film known per se, consisting of synthetic resin, is provided as the adhesion promoter.

The recesses 31 to 36 as well as the channels 41 to 43 are filled with a substantially incompressible fluid, in particular silicone oil. The fluid is introduced into the cavities via capillaries 53 and 54. After filling, the capillaries 53 and 54 are closed pressure-tightly.

Lastly, FIG. 4 shows a sectional representation of a differential pressure measuring transducer having a differential pressure measuring transducer unit according to FIG. 2. In this case, the differential pressure measuring transducer unit is clamped between two flange caps 90, which bear on the outer conductive layers 11 and 16.

Each flange cap 90 comprises a bore 91 whose opening that faces away from the differential pressure measuring transducer unit is equipped with a flange appendage 92. The bore 91 in the flange cap 90 is arranged in the region of the separating membranes 51 and 52 of the differential pressure measuring transducer unit. Each bore 91 in the flange cap 90 is assigned two threaded bores 93, which are configured as blind bores.

The flange caps 90 are screwed together by a multiplicity of bolts 95, which are distributed uniformly over the circumference of the differential pressure measuring transducer unit. To this end, one of the flange caps 90 comprises bores and the opposite flange cap 90 comprises corresponding threaded bores.

For correct use of the differential pressure measuring transducer, an impulse line is attached to each flange cap 90. The impulse lines respectively comprise a flange-like collar, which is held by means of a union plate in the flange appendage 92. The union plate is fastened on the flange cap 90 by screws, which engage into the threaded bores 93.

LIST OF REFERENCES 11 to 17 conductive layer
21 to 26 insulating layer
31 to 38 recess
41 to 43 channel
50 membrane
51, 52 separating membrane
53, 54 capillary
60 measuring mechanism
70 bonding connection
80 measured value processing means
90 flange cap
91 bore
92 flange appendage
93 threaded bore
95 bolt

The invention claimed is:

1. A differential pressure measuring transducer unit with an overload protection system for its measuring mechanism, having at least one sensor, in which the measuring mechanism is connected via pressure-tight electrical feeds to measured value processing means and in which a pressure average spatially separated from a process medium is applied to the measuring mechanism,
wherein a planar multi-layered arrangement consisting of insulating layers and conductive layers insulated from one another is provided, the insulating and conductive layers of which comprise partially overlapping recesses into which the measuring mechanism and the measured value processing means are fitted, and
wherein at least one of the layers is a functional component of the overload protection system.

2. The differential pressure measuring transducer unit as claimed in claim 1, wherein the insulating and conductive layers of the multi-layered arrangement are assembled together with the interposition of an adhesion promoter and by pressure application.

3. The differential pressure measuring transducer unit as claimed in claim 2, wherein the adhesion promoter is solder.

4. The differential pressure measuring transducer unit as claimed in claim 1, wherein one of the insulating layers is configured as a membrane of the overload protection system.

5. The differential pressure measuring transducer unit as claimed in claim 1, wherein one of the conductive layers is configured as a membrane of the overload protection system.

6. The differential pressure measuring transducer unit as claimed in claim 1, wherein at least one of the conductive layers is configured as a separating membrane of the overload protection system.

7. The differential pressure measuring transducer unit as claimed in claim 1, wherein at least one of the insulating layers comprises at least one essentially conical recess, which is covered with a separating membrane of the overload protection system so as to form a chamber.

8. The differential pressure measuring transducer unit as claimed in claim 1, wherein the insulating layers comprise fiber-reinforced synthetic resin.

9. The differential pressure measuring transducer unit as claimed in claim 1, wherein inner conductive layers among the conductive layers, arranged between insulating layers, comprise copper.

10. The differential pressure measuring transducer unit as claimed in claim 1, wherein at least one outer conductive layer among the conductive layers, arranged over the insulating layers, comprise stainless steel.

11. The differential pressure measuring transducer unit as claimed in claim 1, wherein at least two inner insulating layers among the insulating layers are separated from one another comprise at least one congruent recess, each congruent recess being enclosed by neighboring layers among the at least two inner insulating layers so as to form a respective chamber.

12. The differential pressure measuring transducer unit as claimed in claim 1, wherein at least two inner layers among the insulating layers and conducting layers respectively comprise an at least partially congruent recess so as to form a sensor chamber, in which the sensor is fitted, and wherein the sensor is a pressure sensor.

13. The differential pressure measuring transducer unit as claimed in claim 1, wherein at least two inner conductive layers among the conductive layers comprise lateral recesses, which respectively form a channel.

14. The differential pressure measuring transducer unit as claimed in claim 1, wherein at least two inner insulating layers among the insulating layers comprise lateral recesses, which respectively form a channel.

15. The differential pressure measuring transducer unit as claimed in claim 12, wherein the insulating and conductive layers comprise at least one additional chamber, and the sensor chamber and the at least one additional chamber are connected via a channel.

16. The differential pressure measuring transducer unit as claimed in claim 3, wherein one of the insulating layers is configured as a membrane of the overload protection system.

17. The differential pressure measuring transducer unit as claimed in claim 3, wherein one of the conductive layers is configured as a membrane of the overload protection system.

18. The differential pressure measuring transducer unit as claimed in claim 5, wherein at least one of the conductive layers is configured as a separating membrane of the overload protection system.

19. The differential pressure measuring transducer unit as claimed in claim 6, wherein at least one of the insulating layers comprises at least one essentially conical recess, which is covered with the separating membrane of the overload protection system so as to form a chamber.

20. The differential pressure measuring transducer unit as claimed in claim 7, wherein the insulating layers comprise fiber-reinforced synthetic resin.

21. The differential pressure measuring transducer unit as claimed in claim 8, wherein inner conductive layers among the conductive layers, arranged between insulating layers, comprise copper.

22. The differential pressure measuring transducer unit as claimed in claim 9, wherein at least one outer conductive layer among the conductive layers, arranged over the insulating layers, comprises stainless steel.

23. The differential pressure measuring transducer unit as claimed in claim 10, wherein at least two inner insulating layers among the insulating layers are separated from one another comprise at least one congruent recess, each congruent recess being enclosed by neighboring layers among the at least two inner insulating layers so as to form a respective chamber.

24. The differential pressure measuring transducer unit as claimed in claim 10 wherein at least two inner layers among the conductive and insulating layers respectively comprise an at least partially congruent recess so as to form a sensor chamber, in which the sensor is fitted, and wherein the sensor is a pressure sensor.

25. The differential pressure measuring transducer unit as claimed in claim 10, wherein at least two inner conductive layers among the conductive layers comprise lateral recesses, which respectively form a channel.

26. The differential pressure measuring transducer unit as claimed in claim 10, wherein at least two inner insulating layers of the insulating layers comprise lateral recesses, which respectively form a channel.

27. The differential pressure measuring transducer unit as claimed in claim 14, wherein a chamber containing the sensor is connected to another chamber via the channel.

28. A differential pressure measuring transducer unit, comprising:
   a measuring mechanism;
   an overload protection system for the measuring mechanism;
   a measured value processor, the measuring mechanism being connected via pressure-tight electrical feeds to the measured value processor; and
   a planar multi-layered arrangement, wherein insulating and conductive layers form partially overlapping recesses into which the measuring mechanism and the measured value processor are fitted, wherein at least one of the insulating and conductive layers is a functional component of the overload protection system.

* * * * *